United States Patent
Hong et al.

(10) Patent No.: US 11,545,659 B2
(45) Date of Patent: Jan. 3, 2023

(54) NEGATIVE ELECTRODE FOR LITHIUM SECONDARY BATTERY AND MANUFACTURING METHOD THEREOF

(71) Applicant: LG CHEM, LTD., Seoul (KR)

(72) Inventors: Yeon Suk Hong, Daejeon (KR); Seok Koo Kim, Daejeon (KR); Sun Kyu Kim, Daejeon (KR); Ji Won Min, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 272 days.

(21) Appl. No.: 16/643,733

(22) PCT Filed: Nov. 21, 2018

(86) PCT No.: PCT/KR2018/014384
§ 371 (c)(1),
(2) Date: Mar. 2, 2020

(87) PCT Pub. No.: WO2019/103465
PCT Pub. Date: May 31, 2019

(65) Prior Publication Data
US 2020/0403230 A1 Dec. 24, 2020

(30) Foreign Application Priority Data
Nov. 21, 2017 (KR) .......................... 10-2017-0155496

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/0435* (2013.01);
(Continued)

(58) Field of Classification Search
None
See application file for complete search history.

(56) References Cited

U.S. PATENT DOCUMENTS

| 5,435,874 | A | 7/1995 | Takeuchi et al. |
| 5,571,640 | A | 11/1996 | Takeuchi et al. |

(Continued)

FOREIGN PATENT DOCUMENTS

| CN | 102354747 A | 2/2012 |
| CN | 102760860 A | 10/2012 |

(Continued)

OTHER PUBLICATIONS

International Search Report issued in PCT/KR2018/014384 (PCT/ISA/210), dated Mar. 4, 2019.

*Primary Examiner* — Tracy M Dove
(74) *Attorney, Agent, or Firm* — Birch, Stewart, Kolasch & Birch, LLP

(57) ABSTRACT

A negative electrode for a lithium secondary battery, where the negative electrode includes a negative electrode current collector, a negative electrode active material layer, a lithium layer that is positioned between the negative electrode current collector and the negative electrode active material layer, and a primer layer that is positioned between the negative electrode current collector and the lithium layer, and a manufacturing method thereof. This results in a simple method and a negative electrode with high capacity characteristics.

14 Claims, 1 Drawing Sheet

(51) Int. Cl.
  *H01M 4/38* (2006.01)
  *H01M 4/134* (2010.01)
  *H01M 4/1395* (2010.01)
  *H01M 4/48* (2010.01)
  *H01M 4/62* (2006.01)
  *H01M 10/0525* (2010.01)
  *H01M 4/02* (2006.01)

(52) U.S. Cl.
  CPC ......... *H01M 4/134* (2013.01); *H01M 4/1395* (2013.01); *H01M 4/382* (2013.01); *H01M 4/483* (2013.01); *H01M 4/622* (2013.01); *H01M 10/0525* (2013.01); *H01M 2004/027* (2013.01)

(56) References Cited

U.S. PATENT DOCUMENTS

| | | | |
|---|---|---|---|
| 5,580,683 | A | 12/1996 | Takeuchi et al. |
| 2003/0124429 | A1 | 7/2003 | Okada et al. |
| 2005/0130043 | A1 | 6/2005 | Gao et al. |
| 2007/0221265 | A1* | 9/2007 | Affinito ............... H01M 4/385 |
| | | | 136/243 |
| 2010/0291442 | A1 | 11/2010 | Wang et al. |
| 2010/0330430 | A1 | 12/2010 | Chung et al. |
| 2012/0070742 | A1 | 3/2012 | Chung et al. |
| 2012/0276459 | A1 | 11/2012 | Im et al. |
| 2013/0045427 | A1* | 2/2013 | Zhamu ............... H01M 4/386 |
| | | | 977/734 |
| 2013/0143126 | A1 | 6/2013 | Jung et al. |
| 2014/0072873 | A1* | 3/2014 | Wang ............... H01M 4/621 |
| | | | 429/217 |
| 2016/0141596 | A1 | 5/2016 | Uhm et al. |
| 2017/0011861 | A1* | 1/2017 | Dufour ............... C09D 131/04 |
| 2017/0279163 | A1 | 9/2017 | Jang et al. |
| 2021/0066704 | A1* | 3/2021 | Verbrugge ......... H01M 10/052 |

FOREIGN PATENT DOCUMENTS

| | | |
|---|---|---|
| CN | 104201320 A | 12/2014 |
| JP | 9-283179 A | 10/1997 |
| JP | 10-508141 A | 8/1998 |
| JP | 2005-63846 A | 3/2005 |
| JP | 2007-500922 A | 1/2007 |
| JP | 2007-123141 A | 5/2007 |
| JP | 2012-9209 A | 1/2012 |
| JP | 2014-107073 A | 6/2014 |
| KR | 10-2010-0084635 A | 7/2010 |
| KR | 10-2010-0127730 A | 12/2010 |
| KR | 10-2012-0014542 A | 2/2012 |
| KR | 10-2013-0046851 A | 5/2013 |
| KR | 10-1357241 B1 | 2/2014 |
| KR | 10-1454372 B1 | 10/2014 |
| KR | 10-2014-0132294 A | 11/2014 |
| KR | 10-2015-0014676 A | 2/2015 |
| KR | 10-2016-0037782 A | 4/2016 |
| KR | 10-2016-0040020 A | 4/2016 |
| KR | 10-2017-0058798 A | 5/2017 |
| WO | WO 01/63687 A1 | 8/2001 |

\* cited by examiner

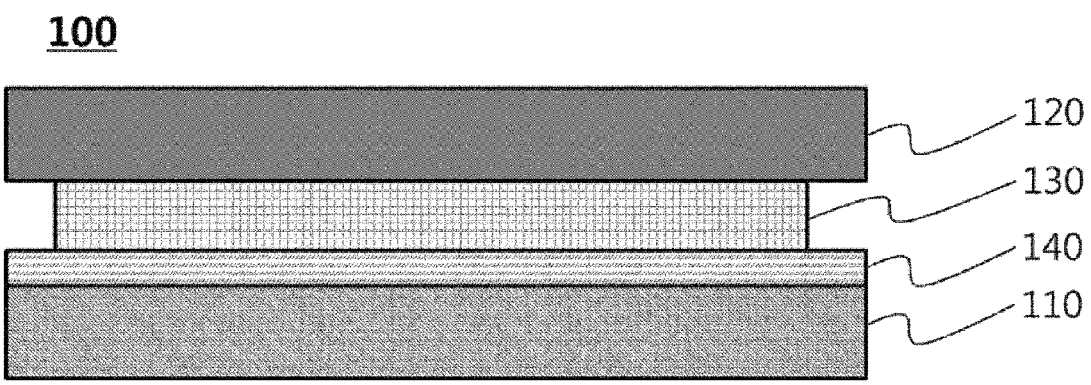

NEGATIVE ELECTRODE FOR LITHIUM SECONDARY BATTERY AND MANUFACTURING METHOD THEREOF

CROSS-REFERENCE TO RELATED APPLICATION

This application claims priority to and the benefit of Korean Patent Application No. 10-2017-0155496, filed on Nov. 21, 2017, the disclosure of which is incorporated herein by reference in its entirety.

TECHNICAL FIELD

The present invention relates to a negative electrode for a lithium secondary battery and a method of manufacturing the same, and more particularly, to a negative electrode for a lithium secondary battery including a lithium layer between a negative electrode current collector and a negative electrode active material layer and a method of manufacturing the negative electrode for a lithium secondary battery.

BACKGROUND ART

As the technical development of and demand for mobile devices increases, the demand for secondary batteries as energy sources has rapidly increased. Among such secondary batteries, lithium secondary batteries, which have high energy density, high operating potential, a long cycle lifespan, and a low self-discharge rate, have been commercially available and widely used.

Meanwhile, a metal oxide such as $LiCoO_2$, $LiMnO_2$, $LiMn_2O_4$, or $LiCrO_2$ has been used as a positive electrode active material constituting a positive electrode of a lithium secondary battery, and metal lithium, a carbon-based material such as graphite or activated carbon, or a material such as silicon oxide ($SiO_x$) has been used as a negative electrode active material constituting a negative electrode of the lithium secondary battery. Although, initially, metal lithium was mainly used as the negative electrode active material, since lithium atoms grow on a surface of the metal lithium as charging and discharging cycles progress, this causes a separator to be damaged, and thus the battery is damaged. Therefore, recently, a carbon-based material has been mainly used as the negative electrode active material. However, since the carbon-based material has a disadvantage in that a theoretical capacity is only about 400 mAh/g and thus capacity is small, various studies have been made to replace the carbon-based material by using silicon having a high theoretical capacity (4,200 mAh/g) as the negative electrode active material.

The lithium secondary battery is charged and discharged while repeating a process in which lithium ions of the positive electrode active material of the positive electrode are intercalated into/deintercalated from the negative electrode active material of the negative electrode.

Theoretically, intercalation and deintercalation reactions of lithium into and from a negative electrode active material are completely reversible, but in practice, more lithium is consumed than the theoretical capacity of the negative electrode active material, and only a part of the lithium is recovered during discharging. Thus, from the second charging and discharging cycle, a smaller amount of lithium ions are intercalated during charging while most of the intercalated lithium ions are deintercalated during discharging. As described above, the difference in capacity that occurs in the reactions during the first charging and discharging is called an irreversible capacity loss, and since commercialized lithium secondary batteries are manufactured in a state in which lithium ions are supplied only to a positive electrode and lithium is not present in a negative electrode, it is important to minimize the irreversible capacity loss in initial charging and discharging.

It is known that the initial irreversible capacity loss is mostly caused by an electrolyte decomposition reaction on a surface of the negative electrode active material, and the electrochemical reaction through the electrolyte decomposition causes a solid electrolyte interface (SEI) film to be formed on the surface of the negative electrode active material. Although a large amount of lithium ions are consumed in the formation of the SEI film, causing the irreversible capacity loss, the SEI film formed at the beginning of charging prevents the reaction between the lithium ions and a negative electrode or other materials during charging and discharging, and functions as an ion tunnel to pass only the lithium ions therethrough so that the electrolyte decomposition reaction is further suppressed, thereby contributing to an improvement of cycle characteristics of the lithium secondary battery.

Accordingly, there is a need for methods to improve initial irreversibility caused by the formation of the SEI film and the like, and one of the methods is to achieve pre-lithiation before manufacturing a lithium secondary battery to allow a negative electrode active material to undergo a side reaction occurring during first charging in advance. As described above, when pre-lithiation is achieved, a first cycle is performed in a state in which irreversibility is reduced as much as when charging or discharging is performed on an actually manufactured secondary battery, and thus there is an advantage in that the initial irreversibility may be reduced.

A conventional pre-lithiation method may include, for example, depositing lithium on a negative electrode active material layer or adhering a lithium thin film on the negative electrode active material layer. After a lithium layer is formed on the negative electrode active material layer as described above, when an electrolyte is injected into a cell after the cell is assembled, lithium ions are diffused onto the negative electrode active material layer, so that pre-lithiation may be achieved. However, when the lithium layer formed on the negative electrode active material layer remains on the negative electrode active material layer even after pre-lithiation, the risk of a subsequent internal short circuit may be increased and there may be a risk of becoming a seed of lithium- (Li-) plating causing Li-plating.

Accordingly, there is a demand for the development of a new negative electrode for a lithium secondary battery capable of achieving more effective pre-lithiation.

DISCLOSURE OF THE INVENTION

Technical Problem

It is an aspect of the present invention to provide a negative electrode for a lithium secondary battery capable of achieving effective pre-lithiation.

It is another aspect of the present invention to provide a method of manufacturing the negative electrode for a lithium secondary battery.

Technical Solution

One aspect of the present invention provides a negative electrode for a lithium secondary battery including a negative electrode current collector, a negative electrode active material layer, a lithium layer positioned between the negative electrode current collector and the negative electrode active material layer, and a primer layer positioned between the negative electrode current collector and the lithium layer.

Another aspect of the present invention provides a method of manufacturing the negative electrode for a lithium secondary battery including (1) forming a primer layer on a negative electrode current collector, (2) forming a lithium layer on the primer layer, and (3) adhering a free-standing negative electrode active material layer on the lithium layer.

Advantageous Effects

In a negative electrode for a lithium secondary battery according to the present invention, pre-lithiation can be effectively achieved by a simple method, and irreversible capacity of the negative electrode can be reduced to exhibit high capacity characteristics.

BRIEF DESCRIPTION OF DRAWINGS

The following drawings appended to the present specification are intended to illustrate exemplary embodiments of the present invention, and the spirit of the present invention will be more clearly understood from the accompanying drawing together with the following description of the invention, and thus illustrations in the drawing should not be construed as limiting the scope of the present invention.

FIG. 1 is a cross-sectional view of a negative electrode of a lithium secondary battery according to one example of the present invention.

BEST MODE FOR CARRYING OUT THE INVENTION

Hereinafter, the present invention will be described in more detail to help understand the present invention.

Terms or words used in the specification and the following claims should not be construed as limited to common or dictionary meanings, and should be construed as meanings and concepts consistent with the spirit of the present invention based on the principle that an inventor can appropriately define concepts and terms to explain the invention of the inventor in the best way.

A negative electrode for a lithium secondary battery according to the present invention includes a negative electrode current collector, a negative electrode active material layer, a lithium layer positioned between the negative electrode current collector and the negative electrode active material layer, and a primer layer positioned between the negative electrode current collector and the lithium layer.

In the negative electrode for a lithium secondary battery according to one example of the present invention, the negative electrode active material is not particularly limited, but may have a large initial irreversible capacity and may include a silicon-based negative electrode active material. Further, in addition to the silicon-based negative electrode active material, the negative electrode active material may include a carbon material, lithium metal, tin, or the like, which is capable of normally intercalating and deintercalating lithium ions.

The silicon-based negative electrode active material may include, for example, one or more selected from the group consisting of Si, particles of silicon oxide ($SiO_x$, $0<x\leq2$), a Si-metal alloy, and an alloy of Si and particles of silicon oxide ($SiO_x$, $0<x\leq2$), and the particles of silicon oxide may be a composite ($SiO_x$, $0<x\leq2$) composed of crystalline $SiO_2$ and amorphous Si. The silicon-based negative electrode active material has large volume changes during charging and discharging, and has a large irreversible capacity due to severe surface side effects during initial charging and discharging, so that the usefulness of achieving pre-lithiation is even greater.

As the carbon material, both low-crystalline carbon and high-crystalline carbon may be used, and representative examples of the low-crystalline carbon include soft carbon and hard carbon, and representative examples of the high-crystalline carbon include natural graphite, Kish graphite, pyrolytic carbon, mesophase pitch-based carbon fiber, mesocarbon microbeads, mesophase pitches, and high-temperature calcined carbon such as petroleum or coal tar pitch derived cokes.

In the negative electrode for a lithium secondary battery according to one example of the present invention, the negative electrode active material layer may have a thickness of 10 μm to 100 μm, and specifically, 50 μm to 80 μm.

The negative electrode active material layer may be a free-standing negative electrode active material layer, and the negative electrode for a lithium secondary battery according to one example of the present invention may be manufactured through a method of forming the lithium layer on the negative electrode current collector and then adhering the free-standing negative electrode active material layer on the lithium layer. In the present invention, the free-standing negative electrode active material layer means a negative electrode active material layer in the form of a thin film or a film which maintains a constant shape by itself without being supported by another substrate or the like.

The negative electrode active material layer may include a conductive material, a negative electrode active material, and a thermoplastic polymer. The free-standing negative electrode active material layer may be prepared, for example, by heating a dispersed mixture, in which a conductive material, a negative electrode active material, and a thermoplastic polymer are dispersed, to a glass transition temperature (Tg) of the thermoplastic polymer to produce a dough-like form having fluidity, and then molding in the form of a thin film or a film.

Since the negative electrode for a lithium secondary battery according to one example of the present invention includes the free-standing negative electrode active material layer, the lithium layer may be positioned between the negative electrode current collector and the negative electrode active material layer. For example, when the negative electrode is manufactured by a method of coating and then drying a negative electrode slurry using a conventional method, coating of an aqueous negative electrode slurry on the lithium layer is impossible due to an intense reaction of lithium and moisture, and, in a case of a non-aqueous negative electrode slurry, coating on the lithium layer is also impossible due to the same problem, that is, the intense reaction of lithium and water, unless a moisture content is controlled to a level of several ppm. However, since the negative electrode for a lithium secondary battery according to one example of the present invention includes the negative electrode active material layer in a free standing form, the negative electrode active material layer may be formed on the lithium layer safely and stably by completing the preparation of the free-standing negative electrode active material layer and then adhering the free-standing negative electrode active material layer, which has its moisture content controlled more precisely and easily, to the lithium layer, so that it is possible to position the lithium layer between the negative electrode current collector and the negative electrode active material layer.

Further, when the negative electrode for a lithium secondary battery according to one example of the present invention includes the free-standing negative electrode active material layer, the negative electrode for a lithium secondary battery may be manufactured to have a size corresponding to the negative electrode current collector regardless of the size and shape of the lithium layer formed on the negative electrode current collector. Accordingly, in the negative electrode for a lithium secondary battery according to one example of the present invention, since the lithium layer is positioned between the negative electrode current collector and the negative electrode active material layer, the negative electrode current collector (including a negative electrode current collector in which an additional layer other than the lithium layer is formed) may not be in direct contact with the negative electrode active material layer.

Even when it is possible to manufacture the negative electrode according to a conventional method in which the negative electrode slurry is applied on the lithium layer, and then dried, assuming that the above-described problem of moisture in the negative electrode slurry does not occur, in order to manufacture the negative electrode in which the negative electrode current collector is not in direct contact with the negative electrode active material layer, an area of the negative electrode active material layer should be proportional to an area of the lithium layer. Thus, in order to secure a loading amount of the negative electrode, the lithium layer should be formed so as to cover a portion corresponding to the entire area of the negative electrode current collector, so that there is no freedom in the area and shape of the lithium layer, and accordingly, in order to include the lithium layer in an amount capable of solving the irreversibility of the negative electrode, there is nothing other than a method of controlling a thickness of the lithium layer. In order to secure the loading amount of the negative electrode, it is necessary that the lithium layer is filled up to an edge portion of the negative electrode current collector as much as possible. However, since lithium ions in the lithium layer located at the edge portion of the negative electrode current collector cannot diffuse in one direction (outward direction from the edge of the negative electrode), there is a high possibility that the lithium layer remains between the negative electrode active material layer and the negative electrode current collector after pre-lithiation, so that the risk of a subsequent internal short circuit and the risk of becoming a seed of lithium- (Li-) plating may not be excluded.

FIG. 1 is a cross-sectional view of the negative electrode of the lithium secondary battery according to one example of the present invention. Referring to FIG. 1, a negative electrode 100 of the lithium secondary battery according to one example of the present invention is presented. The negative electrode 100 includes a free-standing negative electrode active material layer 120, the negative electrode 100 may have a form in which a lithium layer 130 positioned between a negative electrode current collector 110 and a lithium layer 130 has a smaller area than the negative electrode current collector 110 and the negative electrode active material layer 120 while the negative electrode current collector 110 is not in direct contact with the negative electrode active material layer. A primer layer 140 is positioned between the negative electrode current collector 110 and the lithium layer 130.

Lithium included in the lithium layer may supply lithium ions to the negative electrode active material layer, and thus a reduced amount of lithium ions that may be generated by initial irreversibility of the lithium secondary battery including the same may be compensated for in advance. The lithium layer may be consumed in the processes of supplying the lithium ions to the negative electrode by being diffused when an electrolyte is injected into the negative electrode, and initial activation charging of the lithium secondary battery.

The lithium layer may have a thickness of 0.1 µm to 20 µm, specifically, a thickness of 0.5 µm to 15 µm, and more specifically, a thickness of 1 µm to 12 µm. When the lithium layer satisfies the above-described thickness range, the lithium layer may contain lithium metal in an amount capable of compensating for the irreversibility of the negative electrode for a lithium secondary battery while the lithium metal is suitably consumed during the initial activation charging process of the lithium secondary battery, that is, the pre-lithiation process.

The lithium layer may be a lithium metal foil or a lithium deposition layer, and when the lithium layer is the lithium metal foil, the lithium metal foil may be positioned in the form of adhering the lithium metal foil to the negative electrode current collector, and when the lithium layer is the lithium deposition layer, the lithium deposition layer may be formed, for example, by physical vapor deposition (PVD) or chemical vapor deposition (CVD), which includes sputtering, E-Beam, evaporation, or thermal evaporation.

In the negative electrode for a lithium secondary battery according to the present invention, the primer layer is positioned between the negative electrode current collector and the lithium layer.

The primer layer may be positioned between the negative electrode current collector and the lithium layer so that the lithium layer adheres to the negative electrode current collector more easily.

When the negative electrode for a lithium secondary battery according to one example of the present invention includes the primer layer, the lithium layer may be adhered on the negative electrode current collector through the primer layer, and thus there are advantages in the manufacturing process of the lithium secondary battery, and the advantages are that the lithium layer may be directly adhered on the negative electrode current collector in the form of a lithium metal foil without being deposited on the negative electrode current collector, a separate device for depositing the lithium on the negative electrode active material layer is not required, and the lithium layer may be adhered to the negative electrode active material layer in a short time as compared with the time required for the deposition.

The primer layer may include one or more selected from the group consisting of graphene and an epoxy polymer, and may specifically include a mixture of graphene and an epoxy polymer, or an epoxy polymer alone.

The primer layer may have a thickness of 0.1 µm to 10 µm, specifically, 0.2 µm to 5 µm, and more specifically, 0.5 µm to 3 µm.

When the thickness of the primer layer is within the above-described range, the lithium layer may be firmly adhered to the negative electrode current collector, and conductivity between the negative electrode current collector and the negative electrode active material layer may not be deteriorated after pre-lithiation.

A width of the lithium layer may be 1% to 100%, specifically, 5% to 100%, and more specifically, 30% to 100% of the width of the negative electrode current collector.

When the width of the lithium layer falls within the above-described range based on the width of the negative electrode current collector, the negative electrode active material layer is firmly positioned on the lithium layer, so that, even when the lithium layer disappears after pre-lithiation, the negative electrode active material layer may be positioned at an accurate position without deviating from the range of the negative electrode current collector, and the lithium layer may be appropriately consumed by supplying the lithium ions without leaving any residue during pre-lithiation.

Meanwhile, a negative electrode for a lithium secondary battery according to one example of the present invention may be manufactured by a method of manufacturing the negative electrode for a lithium secondary battery including (1) forming a primer layer on a negative electrode current collector, (2) forming a lithium layer on the primer layer, and (3) adhering a free-standing negative electrode active material layer on the lithium layer.

The process (1) of forming the primer layer on the negative electrode current collector may be performed by a method such as applying or coating a material included in the primer layer on the negative electrode current collector. For example, it may be performed by a method such as mixing one or more selected from the group consisting of graphene and an epoxy polymer, specifically a mixture of graphene and an epoxy polymer, or an epoxy polymer alone in a solvent or the like, and then applying or coating the mixture on the negative electrode current collector.

The process (2) of forming the lithium layer on the primer layer may be performed, as described above, by adhering a lithium metal foil on the primer layer or depositing lithium on the primer layer.

After forming the primer layer on the negative electrode current collector and forming the lithium layer on the primer layer as described above, the free-standing negative electrode active material layer is adhered to the lithium layer in the process (3) to manufacture the negative electrode for a lithium secondary battery.

The free-standing negative electrode may be manufactured by a method including (a) dispersing a conductive material, a negative electrode active material, and a thermoplastic polymer to prepare a dispersed mixture, (b) heating the dispersed mixture to a glass transition temperature (Tg) of the thermoplastic polymer, and (c) passing the heated dispersed mixture between rollers heated to the glass transition temperature (Tg) of the thermoplastic polymer and then cooling to prepare a free-standing negative electrode active material layer in the form of a film.

Thus, the method of manufacturing the negative electrode for a lithium secondary battery of the present invention may further include manufacturing the free-standing negative electrode.

In the process (a), the conductive material, the negative electrode active material, and the thermoplastic polymer are dispersed to prepare the dispersed mixture.

The thermoplastic polymer may include one or more selected from the group consisting of ethyl vinyl acetate, nylon, polypropylene, polyethylene, polyethylene oxide, polytetrafluoroethylene (PTFE), and polyvinylidene fluoride (PVdF), and specifically, may include one or more selected from the group consisting of ethyl vinyl acetate, nylon, and polyethylene oxide.

When the thermoplastic polymer includes the above-described components, since the dispersed mixture may have a dough-like form having adequate fluidity when the dispersed mixture prepared by dispersing the conductive material, the negative electrode active material, and the thermoplastic polymer is heated to the glass transition temperature (Tg) of the thermoplastic polymer in a subsequent process, the free-standing negative electrode active material layer may be prepared in a suitable film form.

The dispersed mixture may further include a binder and other additives as necessary.

In the process (b), the dispersed mixture thus prepared is heated to the glass transition temperature (Tg) of the thermoplastic polymer. When the dispersed mixture is heated to the glass transition temperature (Tg) of the thermoplastic polymer, the thermoplastic polymer has fluidity, so that the dispersed mixture has a dough-like form.

In the process (c), the dispersed mixture thus heated is passed between the rollers heated to the glass transition temperature (Tg) of the thermoplastic polymer to be molded in the form of a thin film, which has an appropriate thickness as a negative electrode active material layer, and then cooled and hardened to prepare the free-standing negative electrode active material layer in the form of a film. In the process of passing the dispersed mixture between the heated rollers, a rolling process may be performed, which may be performed in a conventional negative electrode manufacturing process.

In the negative electrode for a lithium secondary battery according to one example of the present invention thus manufactured, lithium ions in the lithium layer are diffused into the negative electrode active material layer, and thus pre-lithiation of the negative electrode active material may be achieved.

Accordingly, the present invention further provides a negative electrode for a lithium secondary battery including a negative electrode current collector, a primer layer positioned on the negative electrode current collector, and a negative electrode active material layer positioned on the primer layer, wherein the negative electrode active material layer includes lithium ions diffused through pre-lithiation.

The negative electrode active material layer may have a porosity of 10% to 60%, specifically, 20% to 40%, and more specifically, 25% to 35%.

The negative electrode current collector may generally have a thickness of 3 μm to 500 μm. Any material may be used as a material of the negative electrode current collector without limitation as long as it has electrical conductivity without causing a chemical change in the battery. For example, copper, stainless steel, aluminum, nickel, titanium, calcined carbon, copper or stainless steel surface-treated with carbon, nickel, titanium, silver, or the like, an aluminum-cadmium alloy, or the like may be used. Further, fine irregularities may be formed on a surface of the negative electrode current collector to enhance a bonding force of the negative electrode active material, and the negative electrode current collector may be used in various forms such as a film, a sheet, a foil, a net, a porous body, a foam, and a nonwoven fabric.

As the conductive material and the binder, those generally used in the art may be used.

Various kinds of binder polymers may be used as the binder, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene butadiene rubber (SBR), fluorine rubber, polyacrylic acid, a polymer in which hydrogen of the aforementioned materials is substituted with Li, Na, or Ca, and various copolymers.

The conductive material is not particularly limited as long as it does not cause a chemical change in the battery and has conductivity. For example, graphite such as natural graphite, artificial graphite or the like; carbon black such as acetylene black, Ketjen black, channel black, furnace black, lamp black, thermal black or the like; a conductive fiber such as a carbon fiber, a metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like may be used as the conductive material.

The present invention provides a lithium secondary battery including the above-described negative electrode for a lithium secondary battery. The lithium secondary battery may include the negative electrode, a positive electrode, and a separator interposed between the positive electrode and the negative electrode.

In the negative electrode for a lithium secondary battery, lithium in the lithium layer is diffused into the negative electrode active material layer through pre-lithiation, and thus, the lithium secondary battery may include the negative electrode for a lithium secondary battery including the lithium diffused into the negative electrode active material layer through pre-lithiation.

The positive electrode may be manufactured by a conventional method known in the art. For example, the positive electrode may be manufactured by mixing and stirring a solvent, and as necessary, a binder, a conductive material, and a dispersant with a positive electrode active material to prepare a slurry and then applying (coating) the slurry on a current collector made of a metal material and then compressing and drying.

The current collector made of a metal material is a metal which has high conductivity and to which the slurry of the positive electrode active material may be easily adhered. Any material may be used without limitation as a material of the current collector as long as the material has high conductivity without causing a chemical change in the battery in a voltage range of the battery. For example, stainless steel, aluminum, nickel, titanium, calcined carbon, aluminum or stainless steel surface-treated with carbon, nickel, titanium, silver, or the like, or the like may be used. Further, fine irregularities may be formed on a surface of the current collector to enhance a bonding force of the positive electrode active material. The current collector may be used in various forms such as a film, a sheet, a foil, a net, a porous body, a foam, and a nonwoven fabric and may have a thickness in the range of 3 μm to 500 μm.

Examples of the positive electrode active material may include, but are not limited to, a layered compound such as a lithium cobalt oxide ($LiCoO_2$), a lithium nickel oxide ($LiNiO_2$), $Li[Ni_aCo_bMn_cM^1_d]O_2$ (where $M^1$ is any one or a combination of two or more elements selected from the group consisting of Al, Ga, and In, and $0.3 \le a<1.0$, $0 \le b \le 0.5$, $0 \le c \le 0.5$, $0 \le d \le 0.1$, $a+b+c+d=1$), $Li(Li_eM^2_{f-e-f'}M^3_{f'})O_{2-g}A_g$ (where $0 \le e \le 0.2$, $0 \le f' \le 0.2$, $0 \le g \le 0.2$, and $M^2$ includes Mn and one or more selected from the group consisting of Ni, Co, Fe, Cr, V, Cu, Zn, and Ti, $M^3$ is one or more selected from the group consisting of Al, Mg, and B, and A is one or more selected from the group consisting of P, F, S, and N), or the like, or a compound substituted with one or more transition metals; a lithium manganese oxide such as $Li_{1+h}Mn_{2-h}O_4$ (where $LiMnO_3$, $LiMn_2O_3$, or $LiMnO_2$; a lithium copper oxide ($Li_2CuO_2$); a vanadium oxide such as $LiV_3O_8$, $V_2O_5$, or $Cu_2V_2O_7$; a Ni-site type lithium nickel oxide represented by $LiNi_{1-i}M^4_iO_2$ (where $M^4$ is Co, Mn, Al, Cu, Fe, Mg, B, or Ga, and $0.01 \le i \le 0.3$); a lithium manganese composite oxide represented by $LiMn_{2-j}M^5_jO_2$ (where $M^5$ is Co, Ni, Fe, Cr, Zn, or Ta, and $0.01 \le j \le 0.1$) or $Li_2Mn_3M^6O_8$ (where $M^6$ is Fe, Co, Ni, Cu, or Zn); $LiMn_2O_4$ in which some Li ions in the chemical formula are substituted with alkaline earth metal ions; a disulfide compound; $LiFe_3O_4$ and $Fe_2(MoO_4)_3$, or the like.

Examples of the solvent for forming the positive electrode may include organic solvents such as N-methylpyrrolidone (NMP), dimethylformamide (DMF), acetone, and dimethylacetamide, or water. These solvents may be used alone or in a mixture of two or more thereof. A use amount of the solvent is sufficient for allowing the positive electrode active material, the binder, and the conductive material to be dissolved and dispersed in consideration of an application thickness of the slurry and a production yield.

Various kinds of binder polymers may be used as the binder, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene butadiene rubber (SBR), fluorine rubber, polyacrylic acid, a polymer in which hydrogen of the aforementioned materials is substituted with Li, Na, or Ca, and various copolymers.

The conductive material is not particularly limited as long as it does not cause a chemical change in the battery and has conductivity. For example, graphite such as natural graphite, artificial graphite or the like; carbon black such as acetylene black, Ketjen black, channel black, furnace black, lamp black, thermal black or the like; a conductive fiber such as a carbon fiber, a metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like may be used as the conductive material.

An aqueous dispersant or an organic dispersant such as N-methyl-2-pyrrolidone may be used as the dispersant.

Meanwhile, as the separator, a typical porous polymer film conventionally used as a separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a laminated form thereof. Furthermore, a typical porous nonwoven fabric, for example, a nonwoven fabric formed of high melting point glass fiber or polyethylene terephthalate fiber may be used, but the present invention is not limited thereto.

A lithium salt that may be included as the electrolyte used in the present invention may be used without limitation as long as it is conventionally used as an electrolyte for a lithium secondary battery. For example, an anion of the lithium salt may include one selected from the group consisting of $F^-$, $Cl^-$, $Br^-$, $I^+$, $NO_3^+$, $N(CN)_2^+$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, or the like, which may be used to manufacture lithium secondary batteries, but the present invention is not limited thereto.

An exterior of the lithium secondary battery of the present invention is not particularly limited, and the exterior thereof may be a cylindrical shape using a can, a prismatic shape, a pouch shape, a coin shape, or the like.

The lithium secondary battery according to the present invention may not only be used in a battery cell used as a power source of a small device but also may be preferably used as a unit battery in middle- to large-sized battery modules including a plurality of battery cells.

MODE FOR CARRYING OUT THE INVENTION

Examples

Hereinafter, the present invention will be described in more detail with reference to examples and experimental examples, but the present invention is not limited by these examples and experimental examples. The examples of the present invention may be modified into various forms, and the scope of the present invention should not be construed as being limited to the examples described in detail below. The examples of the present invention are provided to more fully describe the present invention to those skilled in the art.

Example 1

Ethylene black as a conductive material, SiO having an average particle diameter ($D_{50}$) of 7 μm, natural graphite, and polyethylene oxide were mixed at a weight ratio of 2:28.5:66.5:3, and then, the prepared mixed powder was mixed into a flask having a gas pipe inserted thereinto, and after that, dispersed for 60 minutes in an ultrasonic bath while blowing $N_2$.

The dispersed mixture dispersed through the above-described processes was heated to 90° C., which is near a glass transition temperature (Tg) of a thermoplastic polymer, to enable the dispersed mixture to be kneaded, and passed between rollers (interval: 145 μm) preheated at 100° C., and then, cooled to room temperature to prepare a free-standing negative electrode active material layer.

A primer layer was formed by applying a composition in which graphene and an epoxy resin were mixed at a weight ratio of 5:95 on one surface of a copper current collector using a spin coater such that a thickness of the primer layer became 2 μm, and then a lithium foil having a thickness of 40 μm and an area of 30% based on an area of the negative electrode current collector was adhered on the primer layer. The prepared free-standing negative electrode active material layer was adhered on the lithium foil by a roll lamination method using a roll preheated at 90° C. to manufacture a negative electrode.

Example 2

A negative electrode was manufactured in the same manner as in Example 1 except that the thickness of the primer layer of Example 1 was formed to be 6 μm.

Example 3

A negative electrode was manufactured in the same manner as in Example 1, except that only an epoxy resin was used instead of the composition in which graphene and an epoxy resin were mixed to prepare the primer layer of Example 1.

Comparative Example 1

A negative electrode was manufactured in the same manner as in Example 1, except that the primer layer of Example 1 was not formed.

Comparative Example 2

A negative electrode was manufactured in the same manner as in Example 1, except that the 40 μm lithium foil of Example 1 was not used.

Comparative Example 3

A primer layer was formed by applying a composition in which graphene and an epoxy resin were mixed at a weight ratio of 5:95 on one surface of a copper current collector using a spin coater such that a thickness of the primer layer became 2 μm, and then a lithium foil having a thickness of 1 μm and an area of 100% based on the area of the negative electrode current collector was adhered on the primer layer.

Ethylene black as a conductive material, SiO having an average particle diameter ($D_{50}$) of 7 μm, natural graphite, and styrene butadiene rubber (SBR) as a binder were mixed at a weight ratio of 2:28.5:64.5:5 and then diluted with N-methylpyrrolidone (NMP) to prepare a negative electrode mixture slurry.

The prepared negative electrode mixture slurry was intended to be coated on the lithium foil, but production was stopped due to lithium oxidation and heat generation during slurry coating.

Experimental Example 1: Measurement of Adhesion

A 2 cm×10 cm double-sided tape was attached on a slide glass, and each of the negative electrodes manufactured in Examples 1, 2 and 3, and Comparative Examples 1 was cut into a size of 2 cm×10 cm and attached to the double-sided tape by applying a constant force with a 2 kg roller. The 180° peel strength was measured while peeling a current collector from the slide glass on which the electrode was attached. The results are shown in Table 1 below.

Experimental Example 2: Evaluation of Initial Resistance

<Manufacture of Positive Electrode>

96% by weight of a mixture of $LiMn_2O_4$ and $Li(Ni_{0.33}Co_{0.33}Mn_{0.33})O_2$ as a positive electrode active material, 2% by weight of carbon black as a conductive agent, and 2% by weight of polyvinylidene fluoride (PVdF) as a binder were added to N-methyl-2-pyrrolidone (NMP) as a solvent to prepare a positive electrode mixture slurry. The positive electrode mixture slurry was applied on an aluminum (Al) thin film as a positive electrode current collector having a thickness of about 20 μm and dried, followed by roll pressing to manufacture a positive electrode.

<Manufacture of Lithium Secondary Battery>

A secondary battery was manufactured by a conventional method using the positive electrode thus manufactured and the negative electrode manufactured in each of Examples 1 to 3 and Comparative Example 1 together with a separator composed of three layers of polypropylene/polyethylene/polypropylene (PP/PE/PP), and then immersed in an electrolytic solution by injecting an electrolyte in which 1M $LiPF_6$ was dissolved in a solvent in which ethylene carbonate (EC) and diethyl carbonate (DEC) were mixed at a volume ratio of 30:70, for 48 hours to achieve pre-lithiation, thereby completing the manufacture of each lithium secondary battery.

Each lithium secondary battery was charged at a constant current (CC) of 0.33 C at 25° C. until the voltage reached 4.25 V and then charged at a constant voltage (CV) until the charge current reached 0.05 C (cut-off current) to perform first charging. Subsequently, each lithium secondary battery was allowed to stand for 20 minutes, and then discharged at a constant current (CC) of 0.33 C until the voltage reached 2.5 V. Each lithium secondary battery was fully charged in the same manner and was discharged by only 50% of the discharge capacity of 0.33 C, and allowed to stand for 1 hour, and then, a 2.5 C discharge current was applied for 10 seconds, and initial resistance was measured by dividing the difference between the voltage immediately before the application of the current and the voltage after 10 seconds by the current, and the results are shown in Table 1 below.

TABLE 1

|  | Adhesion (gf/20 mm) | Initial resistance (SOC50, Ohm) |
| --- | --- | --- |
| Example 1 | 60.1 | 1.1 |
| Example 2 | 85 | 1.3 |
| Example 3 | 71 | 2.1 |
| Comparative Example 1 | 12.3 | 1.6 |

Referring to Table 1, it was confirmed that, in the case of the lithium secondary battery manufactured using the negative electrodes of Examples 1 to 3, excellent electrode adhesion was exhibited according to the presence of the primer layer.

Experimental Example 3: Evaluation of Pre-Lithiation and Initial Efficiency

A polyolefin separator was interposed between each of the negative electrodes manufactured in Example 1 and Comparative Example 2 and Li metal used as a counter electrode, then an electrolyte solution in which 0.5% by weight of vinylene carbonate and 1M $LiPF_6$ were dissolved in a solvent in which ethylene carbonate (EC) and diethyl carbonate (DEC) were mixed at a volume ratio of 30:70 was injected to manufacture respective coin type half-cells.

Table 2 below shows the ratio of the charged amount at a constant current of 0.1 C and a constant voltage of 0.005 V and the capacity at the time of discharging at 0.1 C/1.5 V in the first charging and discharging of the coin type half-cells.

TABLE 2

|  | Pre-lithiation capacity ($mAh/cm^2$) | Initial efficiency (%) |
| --- | --- | --- |
| Example 1 | 1.4 | 101.2 |
| Comparative Example 2 | 0 | 81 |
| Comparative Example 3 | Production stopped due to lithium oxidation and heat generation during slurry coating | |

Referring to Table 2 above, it may be confirmed that, in the case of the lithium secondary battery manufactured using the negative electrode of Example 1, lithiation using the lithium layer positioned between the negative electrode current collector and the negative electrode active material layer is achieved and thus high initial efficiency is exhibited.

DESCRIPTION OF REFERENCE NUMERALS

100: NEGATIVE ELECTRODE
110: NEGATIVE ELECTRODE CURRENT COLLECTOR
120: NEGATIVE ELECTRODE ACTIVE MATERIAL LAYER
130: LITHIUM LAYER
140: PRIMER LAYER

The invention claimed is:

1. A negative electrode for a lithium secondary battery, comprising:
    a negative electrode current collector;
    a negative electrode active material layer;
    a lithium layer positioned between the negative electrode current collector and the negative electrode active material layer; and
    a primer layer positioned between the negative electrode current collector and the lithium layer,
    wherein the primer layer comprises graphene and an epoxy polymer, and
    wherein a thickness of the primer layer is from 0.1 μm to 10 μm.

2. The negative electrode for the lithium secondary battery of claim 1, wherein the negative electrode active material layer comprises one or more selected from the group consisting of Si, particles of silicon oxide ($SiO_x$, 0<x≤2), and a Si-metal alloy.

3. The negative electrode for the lithium secondary battery of claim 1, wherein the negative electrode active material layer is a free-standing negative electrode active material layer.

4. The negative electrode for the lithium secondary battery of claim 1, wherein the lithium layer is a lithium metal foil or a lithium deposition layer.

5. The negative electrode for the lithium secondary battery of claim 1, wherein the lithium layer has a thickness of 0.1 μm to 20 μm.

6. The negative electrode for the lithium secondary battery of claim 1, wherein a width of the lithium layer is 1% to 100% of a width of the negative electrode current collector.

7. A negative electrode for a lithium secondary battery, comprising:
    a negative electrode current collector;
    a primer layer positioned on the negative electrode current collector; and
    a negative electrode active material layer positioned on the primer layer, wherein the negative electrode active material layer comprises a lithium ion diffused through pre-lithiation, wherein the primer layer comprises graphene and an epoxy polymer, and wherein a thickness of the primer layer is from 0.1 μm to 10 μm.

8. A lithium secondary battery, comprising the negative electrode for the lithium secondary battery according to claim 7.

9. A method of manufacturing the negative electrode for the lithium secondary battery according to claim 1, the method comprising:

(1) forming the a primer layer on the negative electrode current collector, wherein the primer layer comprises graphene and an epoxy polymer;

(2) forming the lithium layer on the primer layer; and (3) adhering the negative electrode active material layer on the lithium layer, wherein the negative electrode active material layer is a free-standing negative electrode active material layer.

10. The method of claim 9, wherein the free-standing negative electrode active material layer is formed by:

(a) dispersing a conductive material, a negative electrode active material, and a thermoplastic polymer to prepare a dispersed mixture;

(b) heating the dispersed mixture to a glass transition temperature (Tg) of the thermoplastic polymer; and (c) passing the heated dispersed mixture between rollers heated to the glass transition temperature (Tg) of the thermoplastic polymer and then cooling to prepare the free-standing negative electrode active material layer as a film.

11. The method of claim 10, wherein the thermoplastic polymer comprises one or more selected from the group consisting of ethyl vinyl acetate, nylon, polypropylene, polyethylene, polyethylene oxide, polytetrafluoroethylene (PTFE), and polyvinylidene fluoride (PVdF).

12. The method of claim 9, wherein the free-standing negative electrode active material layer is formed by:

(a) dispersing a conductive material, a negative electrode active material, and a thermoplastic polymer to prepare a dispersed mixture;

(b) heating the dispersed mixture; and (c) passing the heated dispersed mixture between heated rollers and then cooling to prepare the free-standing negative electrode active material layer as a film.

13. The negative electrode for the lithium secondary battery of claim 1, wherein the thickness of the primer layer is from 2 μm to 6 μm.

14. The negative electrode for the lithium secondary battery of claim 7, wherein the thickness of the primer layer is from 2 μm to 6 μm.

* * * * *